United States Patent

Dixon

[11] 4,324,518
[45] Apr. 13, 1982

[54] DISH COMPENSATING FLUSH HEAD FASTENER

[75] Inventor: Richard D. Dixon, El Toro, Calif.

[73] Assignee: Huck Manufacturing Company, Irvine, Calif.

[21] Appl. No.: 57,341

[22] Filed: Jul. 13, 1979

[51] Int. Cl.³ .............................................. F16B 19/05
[52] U.S. Cl. ...................................... 411/361; 411/507
[58] Field of Search ................ 85/7, 5 R, 37, 9 R; 403/408; 29/446, 509; 411/361, 360, 507, 506, 504, 501

[56] References Cited

U.S. PATENT DOCUMENTS

| | | | |
|---|---|---|---|
| 3,680,429 | 8/1972 | Briles | 85/37 |
| 3,702,087 | 11/1972 | Schmitt | 85/39 |
| 3,748,948 | 7/1973 | Schmitt | 85/37 X |
| 3,792,933 | 2/1974 | Stencel | 85/7 X |
| 3,927,458 | 12/1975 | Spearman | 85/37 X |
| 3,936,205 | 2/1976 | Spearman | 85/37 X |
| 4,000,680 | 1/1977 | Briles | 85/37 |
| 4,086,839 | 5/1978 | Briles | 85/37 |
| 4,159,666 | 7/1979 | Briles | 85/37 |

FOREIGN PATENT DOCUMENTS 1442508  7/1976  United Kingdom ................ 85/7

Primary Examiner—Ramon S. Britts
Attorney, Agent, or Firm—Harness, Dickey & Pierce

[57] ABSTRACT

A two piece flush type fastener is provided with an improved head structure which includes a raised dish compensating portion on the outer end thereof the height of which is proportioned relative to anticipated peak installation loads, nominal pin diameter and material shear strength such that upon setting of the fastener the head will controllably yield so as to provide a substantially flat head surface on the installed fastener and eliminate the reduction in head strength which may accompany excessive dishing of the head outer surface. The dish compensating raised surface portion on the head also enables formation of a higher tensile strength joint having improved fatigue performance for a given size head.

8 Claims, 3 Drawing Figures

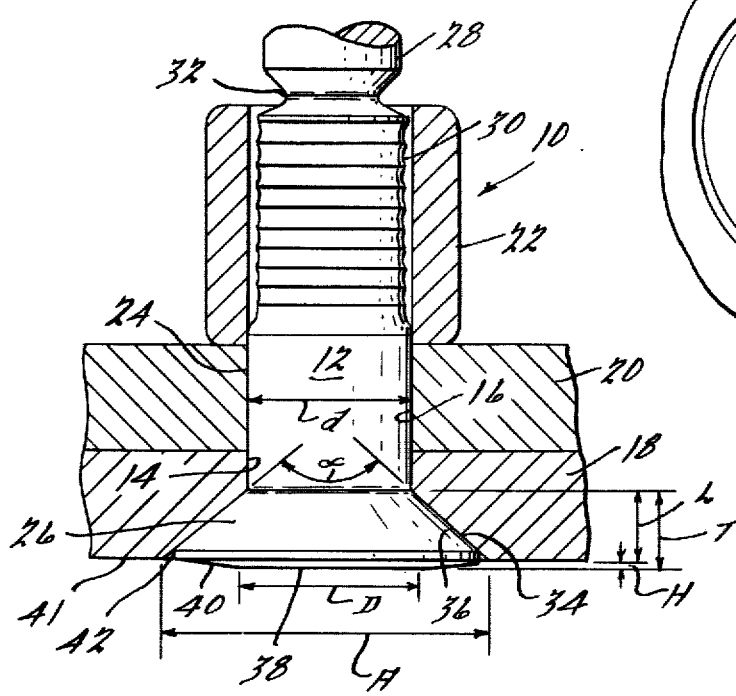
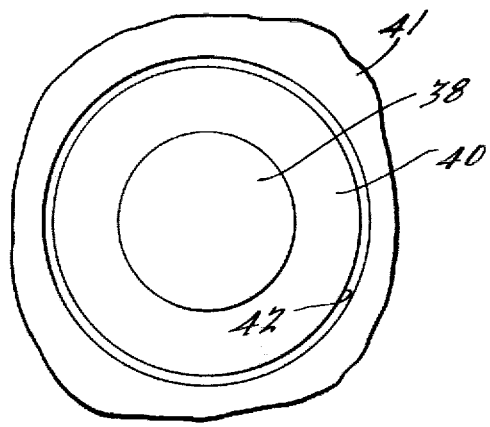
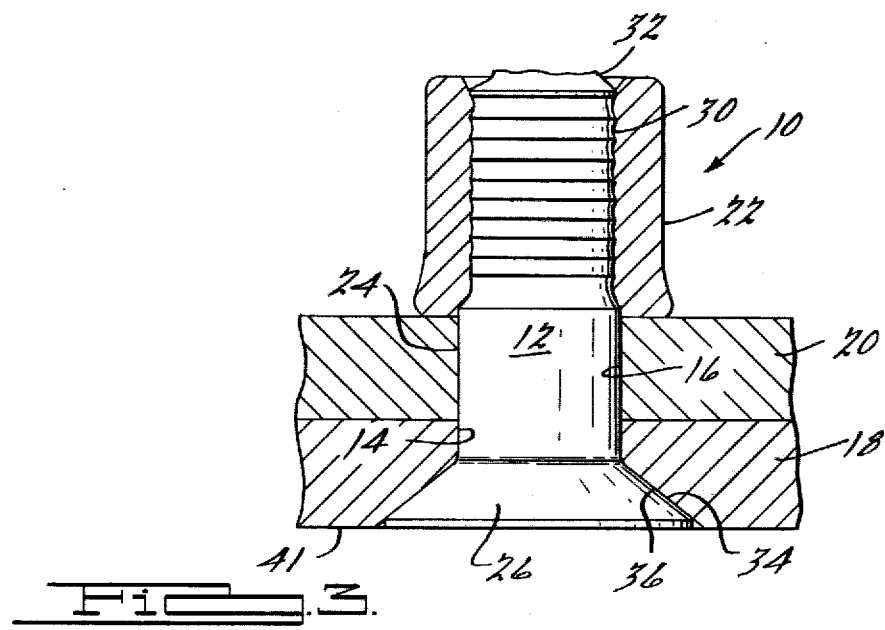

DISH COMPENSATING FLUSH HEAD FASTENER

BACKGROUND AND SUMMARY OF THE INVENTION

The present invention relates generally to two piece fasteners and more particularly to improved flush head shear type two piece fasteners.

Two piece flush head shear type fasteners typically include a pin having a frusto conically shaped head at one end of an elongated shank which is designed to fit within a suitably prepared countersunk opening in workpieces to be joined. The shank portion of such fasteners generally includes a plurality of lock grooves projecting outwardly beyond the workpieces, a separable pintail portion on the outer end thereof normally having a plurality of pull grooves provided thereon and a collar adapted to be swaged into engagement with the lock grooves.

Such fasteners are well known in the art and are designed to be installed or set by an installation tool which includes a jaw assembly engageable with the pull grooves of the pintail portion and a swaging anvil engageable with the collar. As the tool is actuated the jaws exert a pulling action on the pin and the swaging anvil applies the reaction force to the collar. During the initial or primary clinching operation, the workpieces are first drawn together and the pin drawn into and fully seated within the prepared opening. As the relative free movement between the pin and collar is taken up continued pulling action of the tool will increase the tensile loading on the pin and thereby produce an increasing reactionary force on the collar. As these forces increase, the swaging anvil will operate to swage the collar into the outer lock grooves on the pin thereby providing a primary clinch or lock therebetween and preventing any further relative free movement between the pin and collar. Thereafter, the continued swaging of the collar causes an axial elongation thereof forcing the other end of the collar to exert a clamping force on the workpieces and resulting in increased tensile loading on the pin. This increased pin loading due to collar elongation is commonly referred to as secondary clinch loading. Thus, during installation or setting of the fastener, the preformed head provided on the pin is subjected to the combined loading from the action of the installation tool and the secondary clinch loading.

A number of factors influence the actual magnitude of these combined loading forces several of which also directly affect the strength of the installed fastener such as for example collar hardness. In applications requiring relatively high strength it is desirable to use as hard a collar as possible in order to increase the clamping force on the workpieces as well as to increase the fatigue life and improve tensile strength characteristics. However, as collar hardness increases, the required installation loads also increase thus resulting in increased loading on the fastener and the preformed head. Thus, as collar hardness increases these combined forces may exceed the rated head strength of the pin resulting in a partial yielding of the head and degradation of the resulting joint strength. Typically, such degradation is physically evidenced by a dishing or dimpling of the otherwise relatively flat surface of the pin head. Such occurrences are most commonly experienced in conjunction with setting of the shear type fasteners which have a substantially smaller head relative to pin diameter. Therefore, it appears that the head size presents a limiting factor as to the maximum collar hardness which may be used in conjunction therewith and therefore limits the tensile strength and clamping forces which may be obtained. It is not practical nor commercially desirable to design different size preformed heads for fasteners of the same nominal shank diameter for varying collar hardness as each head size would then require separate hole preparation tools to be used in order to assure proper sizing of the countersunk opening.

The present invention, however, provides an improved fastener having a raised head portion of a dimension proportioned to the anticipated peak installation load resulting from both installation tool loading and secondary clinch loading and proportioned to the relative shear strength and diameter of the pin so as to substantially reduce or eliminate the dishing of the fastener head during setting thereof and provide a fastener having a substantially flat flush head when set. Further, the raised head portion results in a pin having a head of increased shear strength thus enabling use of collars of increased hardness resulting in a higher tensile strength fastening system while allowing existing standard hole preparation tools to be utilized. Also, because the frequency of rejected head installations is substantially reduced, cost savings will be realized from the reduction in expenditure of materials and labor attendent with the removal and reinstallation of rejected fasteners.

Further, the head design of the present invention may provide a positive indication or properly installed fasteners. More specifically, because the dimensions of the raised surface portion of the head may be controlled so as to require a predetermined loading in order to flatten out this raised surface portion, the degree of flatness will be proportionate to this loading and also to the degree of clamping force the workpieces are subjected to due to secondary clinch loading. Thus, insufficient "flatness" may provide an indication of inadequate clamping or preloading of the workpieces which may result in premature fatigue failure whereas excessive "flatness" or even dishing may indicate excessive loading and possible damage to the workpieces within the area surrounding the joint as well as reduced tensile strength due to head degradation.

Additional advantages and features of the present invention will become apparent from the subsequent description and the appended claims taken in conjunction with the accompanying drawings.

BRIEF DESCRIPTION OF THE DRAWINGS

FIG. 1 is a sectioned elevational view of a two piece flush head pull type fastener in accordance with the present invention shown prior to setting thereof;

FIG. 2 is a plan view of the outer surface of the performed head provided on the fastener of FIG. 1; and FIG. 3 is a view similar to that of FIG. 1 but showing the fastener thereof in a finally set condition.

DESCRIPTION OF THE PREFERRED EMBODIMENT

Referring now to the drawings and in particular to FIG. 1, there is shown a fastener in accordance with the present invention indicated generally at 10 and comprising a pin 12 inserted within prepared aligned openings 14 and 16 provided in workpieces 18 and 20 and a collar member 22 assembled thereto in preparation for setting.

Pin 12 includes a shank portion 24 of a nominal diameter "d" and having a head 26 at one end, a separable pintail portion 28 at the other end thereof, a plurality of annular locking grooves 30 between head 26 and pintail portion 28 and a breakneck groove 32 disposed between the locking grooves 30 and pintail portion 28.

Preformed head 26 includes a generally conically shaped sidewall 34 designed to mate with a similarly shaped countersunk portion 36 of opening 14 and forming an included angle α typically on the order of approximately 100°. The outer edge of countersunk portion 36 has a diameter "A" which is commonly referred to as the theoretical head intersection diameter. The outwardly facing surface of head 26 is defined by a relatively flat raised central surface portion 38 positioned a distance "H" above a plane defined by the outer surface 41 of workpiece 18 and having a diameter "D". An annular beveled or slightly inclined surface portion 40 surrounds raised surface portion 38 and extends between the periphery of portion 38 and the peripheral edge 42 of head 26.

As shown, head 26 has a total axial height "T" which is measured between approximately the point of intersection of sidewall 34 with shank portion 20 and raised surface portion 40 and is equal to the sum of the dimension "L" measured between the point of intersection of sidewall 34 and shank portion 20 and surface 40 of workpiece 18 and the dimension "H".

As previously mentioned, pull type fasteners are subject to tensile loading during installation which may exceed the designed head shear strength due to the combined forces of the pulling tool and secondary clinch loading particularly in such fasteners designed for shear loading as opposed to those designed for tensile loading. In such fasteners having a conventionally shaped outer head surface this tensile loading may result in excessive head deformation. In order to minimize this deformation, it has been necessary to use softer collars than may otherwise be desired so as to reduce secondary clinch loading. However, the use of softer collars reduces the tensile strength of the installed fastener.

However, the present invention enables the use of collars of increased hardness by providing a head having an increased total height which operates to reduce the head shear stress experienced due to the increased tensile loading during setting. Further, the dimension "H" of the raised surface portion 38 is directly proportioned relative to the difference between the installation loading and the desired maximum head strength such that as secondary clinch loading increases during setting of the fastener up to the desired maximum, the head will yield thereby relieving further secondary clinch loading and allowing raised surface portion 38 to be drawn toward surface 40 so as to form a substantially flat head on the installed fastener.

For any diameter pin this dimension "H" may be calculated by the following formula:

$$H = \left(\frac{P_P - P_D}{P_P}\right)\left(\frac{A - d}{2}\right)\left(\cot\frac{\alpha}{2}\right)$$

$P_P$ = anticipated peak installation loading
$P_D$ = maximum desired head strength
$A$ = theoretical head intersection diameter In order to achieve full advantage of the increased head axial length as well as to facilitate of a substantially flat outer surface on the set fastener, it is preferable that the diameter "D" of the raised surface portion be approximately equal to the nominal diameter "d" of the pin.

The incremental increase in head axial length operates to increase the overall shear strength of the head and further increase the load to which the pin may be subjected before the material yields.

Once installation loading due to the combined effect of the pulling action of the tool and secondary clinch loading increases to a sufficient magnitude, the pin head will begin to yield or plastically deform thereby drawing raised surface portion toward the plane defined by surface 41 of workpiece 18. As head 26 yields, however, the effect is to relieve to some degree the secondary clinch loading which in turn will reduce the total installation loading on the pin head to a point at which the installation load will be below the load necessary to cause yielding.

In a conventional flush head shear type fastener, as the yield strength of the head is exceeded during a peak installation loading, the shear area over which the load is distributed is decreased due to the dishing of the head. Further, as the total shear area provided is less than in the present invention, the yielding will occur at a lower loading and further will require a greater amount of deformation in order to reduce to a lower magnitude, the result being significant dishing and therefore significant reduction in head shear strength during peak installation loading.

However, as shown in FIG. 2, with the increased shear area provided by the raised surface portion, the magnitude of loading at which yield occurs is increased sufficiently such that the amount of head deformation necessary to relieve the loading to a point where the stress on the head is below the yield strength is substantially reduced. The dimension of the raised surface area is thus proportioned such that under installation loading the head yield strength may be exceeded resulting in plastic deformation thereof, the raised surface portion will be drawn axially toward the workpieces eliminating what otherwise would be a dishing effect and thereby producing a relatively flat flush head surface disposed in substantially coplanar relationship with the workpiece surface. The axial length of the head is thus preserved thereby affording a shear strength commensurate with and capable of affording a fastened joint having a tensile strength at least equal to the minimum desired tensile strength. The required axial length of the fastener as thus set may then be approximately determined by the following formula $$L = (P_D / d f_{su})$$

wherein $f_{su}$ equals the pin material rated shear strength.

It should also be noted that not only does the head design of the present fastener enable use of collars of increased hardness for a given size head thereby providing a fastened joint having increased tensile strength, improved and controlled workpiece clamping but the reduction in height of the raised surface portion provides physical evidence that the desired clamping force on the workpieces has been obtained.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. In a two piece shear type fastener for joining together a plurality of workpieces including a pin having a preformed head provided on one end thereof, a shank portion provided with a plurality of grooves and one piece circumferentially continuous collar means adapted to engage one of the outer surfaces of said plurality of workpieces and to cooperate with said grooves to join said plurality of workpieces together, said preformed head being subjected to an axially directed installation tensile loading resulting in part from a pulling force and from the engagement of said collar means with said one surface of said plurality of workpieces, said preformed head comprising a sidewall including a generally concically shaped portion adapted to be received in and substantially conform to the shape of a prepared countersunk opening in the other outer surface of said plurality of workpieces, a centrally disposed raised axially outwardly facing surface portion and an annular beveled radially outwardly extending surface portion surrounding said raised surface portion and forming an intersection with said sidewall, said intersection being adapted to be positioned in substantially coplanar relationship with said other outer surface of said plurality of workpieces, said raised surface portion being positioned axially outwardly from said other outer surface a distance proportioned to the shear stress of the pin material and to the difference between a predetermined anticipated peak installation loading and the desired installation fastener head strength divided by the anticipated peak installation load so that said preformed head may operate to relieve a portion of said axially directed installation load whereby said raised surface portion is operative to substantially eliminate dishing of said head during installation loading.

2. A fastener as set forth in claim 1 wherein said raised surface portion has a diameter substantially equal to the nominal diameter of the pin shank.

3. A fastener as set forth in claim 1 wherein said raised surface portion is proportioned relative to said difference between said anticipated installation loading and the desired head strength such that subsequent to setting of said fastener said raised surface is positioned in substantially coplanar relationship with said outer surface of said workpiece when said fastener has been subjected to an installation loading during setting thereof of a predetermined minimum magnitude.

4. A fastener as set forth in claim 3 wherein said head is operative to yield during installation of said fastener so as to limit the clamping force exerted on said workpieces to a magnitude no greater than a predetermined maximum.

5. In a two piece shear type fastener for securing together a plurality of workpieces including a pin having a preformed head provided on one end thereof, a shank portion provided with a plurality of lock grooves and a collar adapted to be swaged into locking engagement with said lock grooves through the action of an installation tool operative to exert a relative axial pulling force on said shank portion of said pin, said preformed head being subjected to an axially directed installation load resulting in part from said pulling force and in part from swaging of said collar, said preformed head comprising a sidewall including a generally conically shaped portion adapted to be received in and substantially conform to the shape of a prepared countersunk opening in one of said workpieces, a centrally disposed raised axially outwardly facing surface portion, said raised surface portion having a diameter substantially equal to the nominal diameter of said shank portion and an axial dimension substantially equal to "H" as measured from the outer surface of said one of said workpieces wherein $$H = \left(\frac{P_P - P_D}{P_P}\right)\left(\frac{A - d}{2}\right)\left(\cot\frac{\alpha}{2}\right)$$

prior to setting of said fastener whereby dishing of said preformed head when said fastener is subjected to installation loading is substantially eliminated and $P_P$ = anticipated peak installation load
$P_D$ = desired installation fastener head strength
A = theoretical head intersection diameter
d = nominal pin shank diameter
$\alpha$ = included angle of said head sidewall.

6. A fastener as set forth in claim 5 wherein said raised surface portion is proportioned relative to said difference between said anticipated installation loading and the desired head strength such that subsequent to setting of said fastener said raised surface portion is positioned in substantially coplanar relationship with said outer surface of said workpiece when said fastener has been subjected to an installation loading during setting thereof at least equal to a predetermined minimum.

7. A fastener as set forth in claim 5 wherein said preformed head has an axial dimension substantially equal to "L" after said fastener is set wherein $$L = (P_D/df_{su})$$

and $f_{su}$ equals pin material minimum rated shear strength, L being measured between the intersection of said sidewall with said shank and said outer surface.

8. In a two piece shear type fastener for joining together a plurality of workpieces including a pin having a preformed head of a predetermined size provided on one end thereof, a shank portion provided with a plurality of lock grooves and a collar adapted to be swaged into locking engagement with said lock grooves through the action of an installation tool operative to exert a relative axial pulling force on said shank portion of said pin, said preformed head being subjected to an axially directed installation load resulting in part from said pulling force and in part from swaging of said collar, said preformed head comprising a sidewall including a generally conically shaped portion adapted to be received in and substantially conform to the shape of a prepared countersunk opening in one of said workpieces, a centrally disposed raised axially outwardly facing surface portion and an annular beveled radially outwardly extending surface portion surrounding said raised surface portion and forming an intersection with said sidewall, said intersection being adapted to be positioned in substantially coplanar relationship with the outer surface of said one of said workpieces, said raised surface portion being positioned axially outwardly from said outer surface a distance H as measured from substantially the outer surface of said one of said workpieces such that as said fastener is subjected to installation tensile loading said raised surface portion will be drawn toward said outer surface and into substantially coplanar relatiohship therewith so that said preformed head may operate to relieve a portion of said installation load thereby enabling collars of increased hardness to be swaged into said lock grooves whereby the tensile strength of the set fastener is increased and said raised surface portion is operative to substantially eliminate excessive dishing of said head, and wherein $$H = \frac{P_P - P_D}{P_P} \; \frac{A - d}{2} \; \cot \frac{\alpha}{2}$$

prior to setting of said fastener and
 $P_P$ = anticipated peak installation load
 $P_D$ = desired installation fastener head strength
 A = theoretical head intersection diameter
 d = nominal pin shank diameter
 $\alpha$ = included angle of said head sidewall.

* * * * *